(12) United States Patent
Kozhukh

(10) Patent No.: US 6,917,409 B2
(45) Date of Patent: Jul. 12, 2005

(54) INTEGRATED SPACER TECHNOLOGY FOR LCOS LIGHT MODULATORS

(75) Inventor: Michael Kozhukh, Palto Alto, CA (US)

(73) Assignee: Intel Corporation, Santa Clara, CA (US)

( * ) Notice: Subject to any disclaimer, the term of this patent is extended or adjusted under 35 U.S.C. 154(b) by 31 days.

(21) Appl. No.: 10/369,074

(22) Filed: Feb. 18, 2003

(65) Prior Publication Data

US 2004/0160567 A1 Aug. 19, 2004

(51) Int. Cl.$^7$ ................................................ G02F 1/13
(52) U.S. Cl. ...................................................... 349/156
(58) Field of Search ........................................ 349/156

(56) References Cited

U.S. PATENT DOCUMENTS 5,739,890 A * 4/1998 Uda et al. .................. 349/156
6,597,425 B2 * 7/2003 Kadota et al. .............. 349/156
6,642,987 B2 * 11/2003 Rutman et al. ............. 349/155
2002/0149720 A1 10/2002 Janssen et al.
2002/0149734 A1 10/2002 Melnik et al.

OTHER PUBLICATIONS

Voltolina, Guido, "Liquid Crystal Meets Silicon in Projection Displays", *Semiconductor International*, Dec. 1, 2002.

* cited by examiner

Primary Examiner—James A. Dudek
(74) Attorney, Agent, or Firm—Carrie A. Boone P.C.

(57) ABSTRACT

An LCOS display, including specially manufactured spacers, and a process for making the display, are disclosed. The spacers ensure a uniform cell gap along the entire display. The spacers occupy a region between pixels, such that they do not interfere with light modulation and are not visible during magnification. The spacers are manufactured using known deposition, lithography and etching techniques, and are made from widely available materials. The process results in a high yield of high-quality LCOS displays.

11 Claims, 5 Drawing Sheets

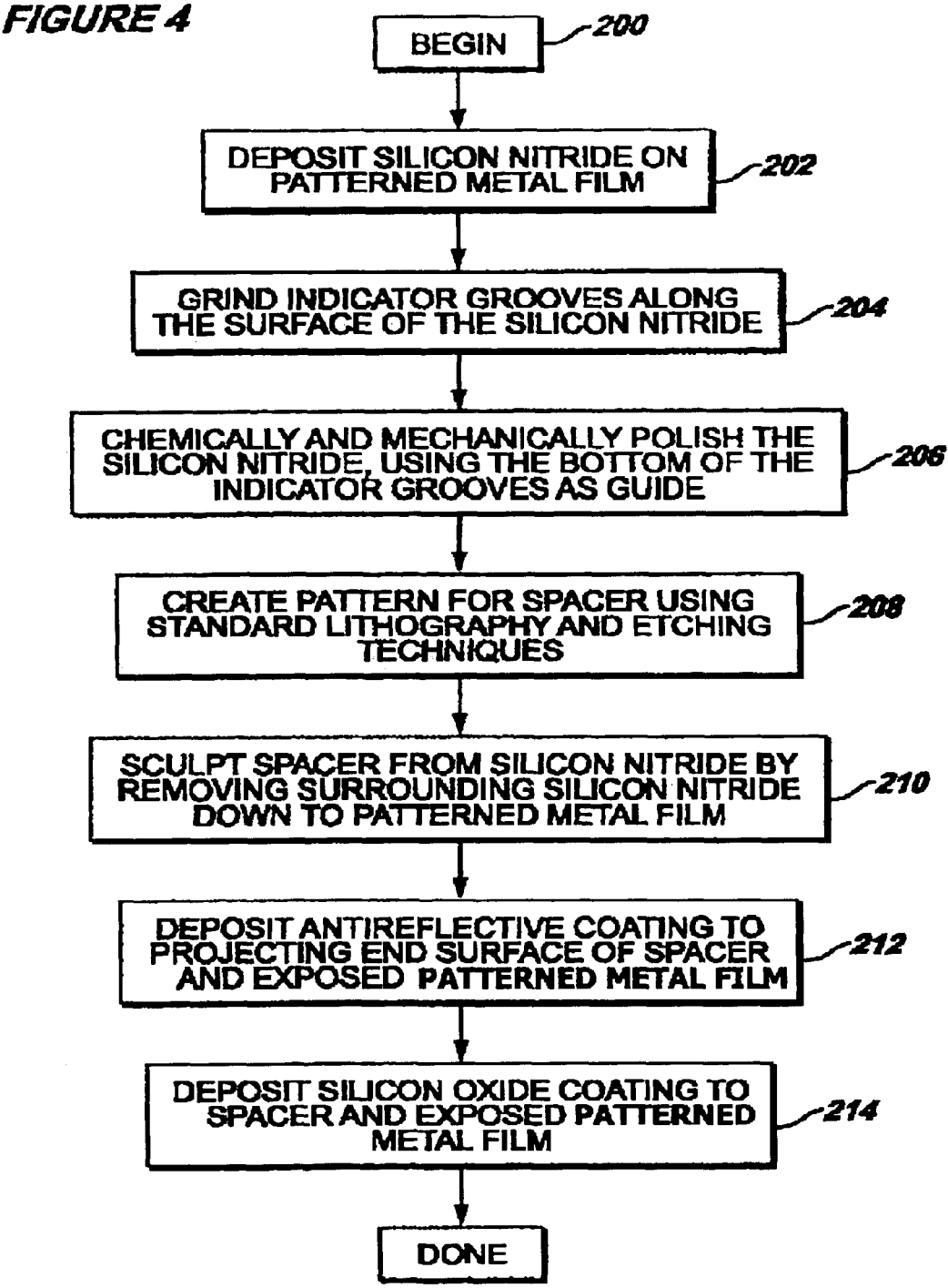

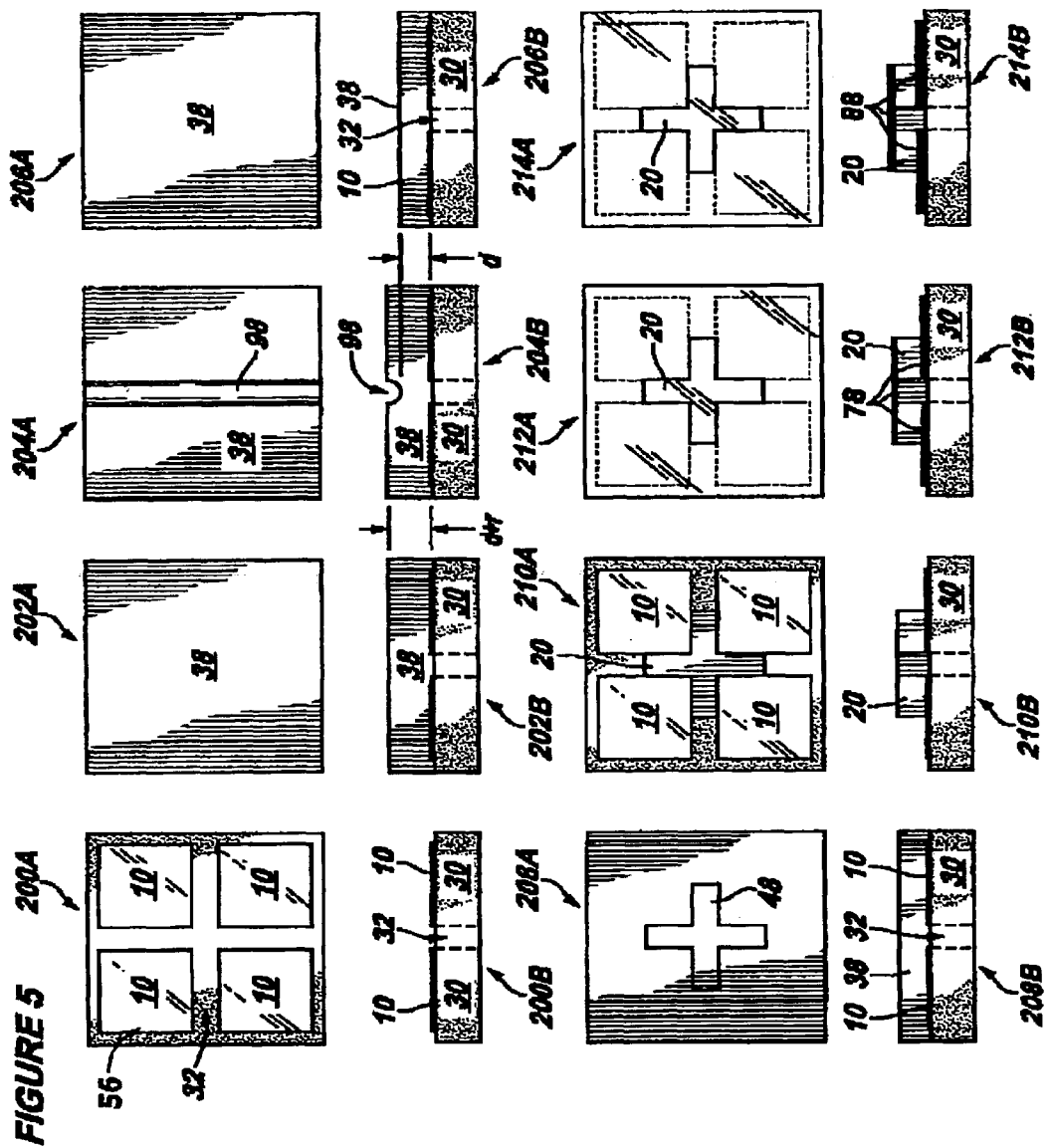

INTEGRATED SPACER TECHNOLOGY FOR LCOS LIGHT MODULATORS

FIELD OF THE INVENTION

This invention relates to optical projection systems and, more particularly, to liquid crystal on silicon (LCOS) display systems.

BACKGROUND OF THE INVENTION

Optical projection systems such as televisions and computer monitors use cathode ray tubes (CRTs) as displays. A liquid crystal on silicon, or LCOS, light modulator, is an alternative display component that has some advantages over CRTs. In particular, LCOS light modulators are flat, thus occupying less space, and use less power than CRTs.

LCOS displays consist of layered components. A surface layer of glass or transparent plastic substrate is disposed over a middle layer of liquid crystal material, which is further supported by an underlying layer of silicon substrate, known as a back plane. The glass or transparent plastic layers are manufactured with transparent electrodes on the surface adjacent to the liquid crystal material. A patterned metal layer is further disposed upon the back plane, comprising hundreds or thousands of reflecting mirrors, known as micro-mirrors.

The LCOS display thus comprises a first glass or plastic layer, an electrode layer, a liquid crystal layer, a second electrode layer, a patterned metal film layer, and a second glass or plastic layer. A pixel of the LCOS display includes a single micro-mirror, along with its associated layers. The LCOS display is thus an array of pixels, including hundreds or thousands of individual pixels.

LCOS displays use polarized lenses to control the transmission of light, known as light modulation, to individual pixels within the pixel array. LCOS displays are thus sometimes referred to as light modulators. The electrodes embedded in the glass or plastic layers allow an electric field to be applied across the liquid crystal material. Molecules in the liquid crystal medium exhibit polarization alignment when subjected to the electric field. The liquid crystal thus acts as a dynamic polarizing medium.

One of the glass or plastic layers of the LCOS display is coated to respond as a static polarizing filter. Together the two polarizing filters modulate the light received by individual pixels of the LCOS display. When the pixel is turned "off," the light attempting to transmit through the pixel is blocked by the polarizing filters. When the pixel is turned "on," the light travels through the polarizing filters unimpeded, reflecting off the micro-mirror.

Due to minute manufacturing inconsistencies or defects, the materials that make up the LCOS light modulator do not have a precise thickness at the microscopic level. These differences in material thickness cause differences in the thickness of the cell gap, or space between the two glass or plastic layers, in which liquid crystal material occupies the cell gap.

To more precisely control cell gap spacing, many manufacturers spray minute glass or plastic beads over the patterned metal film. The glass or plastic beads, or spacers, are meant to ensure that the cell gap is uniform all along the pixel array, thus improving image quality. However, the glass or plastic beads, which share space with the liquid crystal material in the cell gap, may interfere with light traveling through the liquid crystal. Further, when the pixel is turned "on," and the image is magnified, the interference caused by the beads is also enlarged, often appearing as a defect in the display. While the defect may not be apparent on an optical projection system from a distance, it is more likely visible at close proximity to the discriminating eye.

Because of these issues, some LCOS manufacturers are making spacerless displays, with unsatisfying results. Generally, the quality of spacerless displays is poor. Other manufacturers control the cell gap spacing by etching spacers into the overlying glass or plastic plate. This etching technique, while more precisely controlling spacing between the pixels of the display, may continue to adversely affect image quality, as the spacers block the transmission of light through the LCOS media.

Thus, there is a need for an LCOS display in which spacers precisely control the cell gap, but which do not interfere with light transmission through each pixel of the display.

BRIEF DESCRIPTION OF THE DRAWINGS

FIG. 4 is a flow diagram of operations performed in manufacturing the LCOS display of FIG. 1; and FIG. 5 is a diagram, including top and side views, of operations performed in manufacturing the LCOS display of FIG. 1.

DETAILED DESCRIPTION

In accordance with some embodiments described herein, an LCOS display is disclosed, including novel spacers superimposed upon a patterned metal film. The patterned metal film is an array of micro-mirrors disposed upon a silicon back plane or substrate. The spacers ensure that a precise distance between the patterned metal film and an overlying transparent layer is maintained, which improves the image quality of the LCOS display.

The spacers are depicted as cross-shaped, but may assume any shape. Each spacer may lie within a gap between four adjoining pixels of the patterned metal film. The spacers may be oriented so as to be outside of the space in which the transmitted light of the pixel travels. By occupying the nonfunctional space of the LCOS display, the spacers avoid interfering with the light traveling through the display.

A process for making the LCOS display, including the spacers, is disclosed. Spacers of a uniform height along the entire LCOS display are generated during its manufacture, thus creating a uniform cell gap, or gap between the micro-mirrors and the overlying transparent layer. The cell gap is then injected with the liquid crystal material, which is activated as a polarizing filter by transistors disposed beneath the micro-mirrors. The use of the spacers may result in a high-quality projected image from the LCOS display and a higher yield of LCOS displays during manufacture.

In the following detailed description, reference is made to the accompanying drawings, which show by way of illustration specific embodiments in which the invention may be practiced. However, it is to be understood that other embodiments will become apparent to those of ordinary skill in the art upon reading this disclosure. The following detailed description is, therefore, not to be construed in a limiting sense, as the scope of the present invention is defined by the claims.

Figure 1:
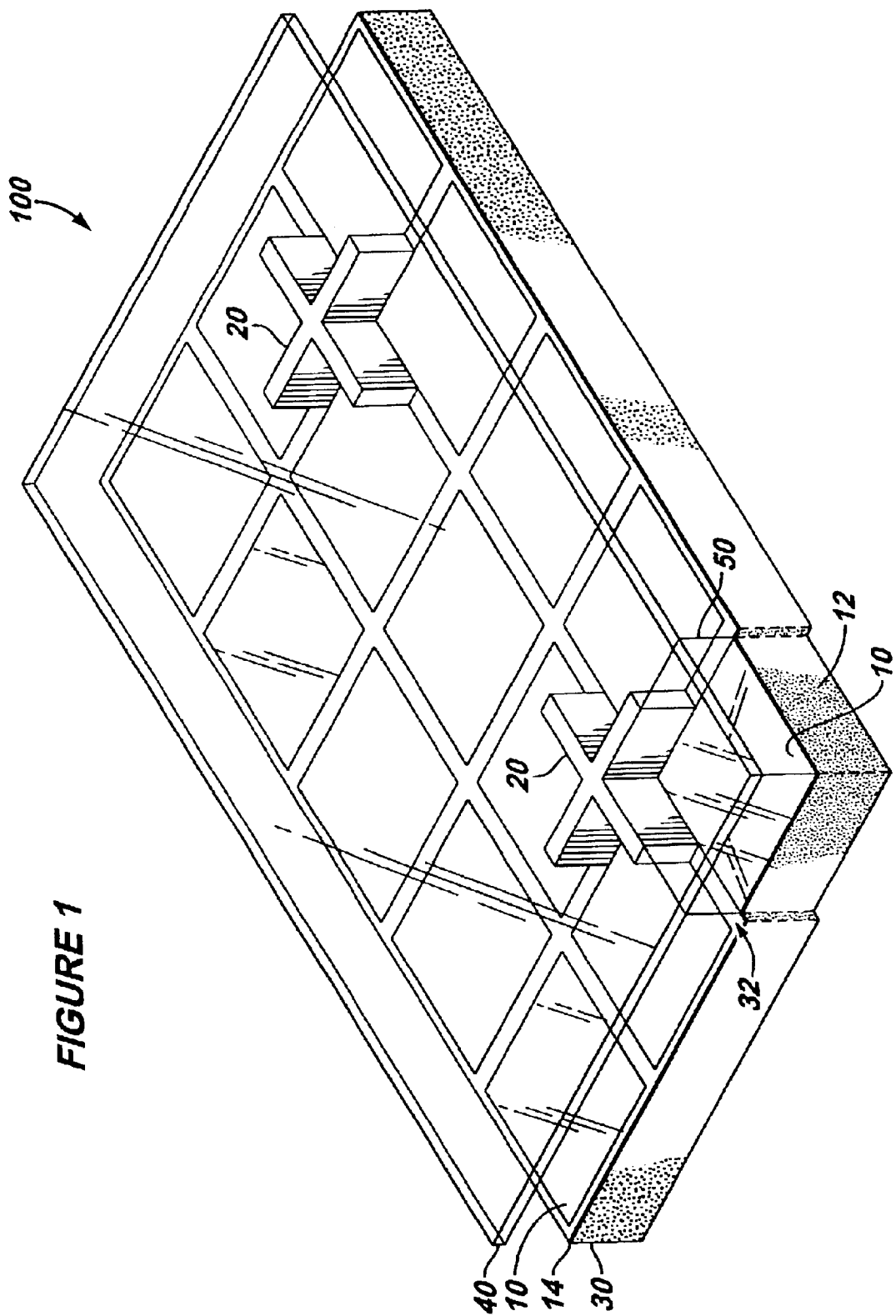
FIG. 1 is a perspective view of an LCOS display with spacers.

FIG. 1 is a perspective view of an LCOS display 100, including two spacers 20, according to some embodiments. The spacers 20 are affixed or otherwise attached to a patterned metal film 14, which is superimposed upon a silicon substrate or back plane 30. The patterned metal film 14 is patterned or etched into multiple distinct micro-mirrors 10, each of which reflects light during light modulation.

The LCOS display 100 further includes a transparent layer or plate 40, comprising glass or plastic material, disposed on top of the spacers 20. Between the patterned metal film 14 and the transparent layer 40 is a layer of liquid crystal 50. For example, the liquid crystal material 50 may be injected between the layers after the spacers 20 are formed.

By design, not all the ambient, or unpolarized, light reaches the micro-mirrors 10 of the LCOS display 100. Using the principles of polarization, the light is filtered to control which pixels receive light. Unpolarized light, which consists of light waves oriented in all directions, can be converted to polarized light, or light waves oriented in a particular direction, using a polarizing filter or lens.

A polarizing lens blocks light waves that are oriented orthogonal to the lens, for example, but transmits light oriented parallel to the lens. Such a polarized lens neither wholly blocks nor wholly transmits the unpolarized light. Two polarized lenses, however, may be able to wholly block or wholly transmit unpolarized light, such as by adjusting the relative positions of the lenses.

Accordingly, in the LCOS display 100, the transparent layer 40 includes electrodes (not shown) which, in conjunction with electrodes disposed within the substrate 30 (not shown), produce a polarizing effect on the liquid crystal 50 when an electric signal is sent to the LCOS display 100. Circuitry, such as transistors, is embedded within the substrate 30 (not shown), to produce the electric signal. The electrodes may be made of aluminum oxide, tin oxide, or aluminum-tin oxide, as examples. The transparent layer 40 operates as a second polarizing filter.

Figure 2:
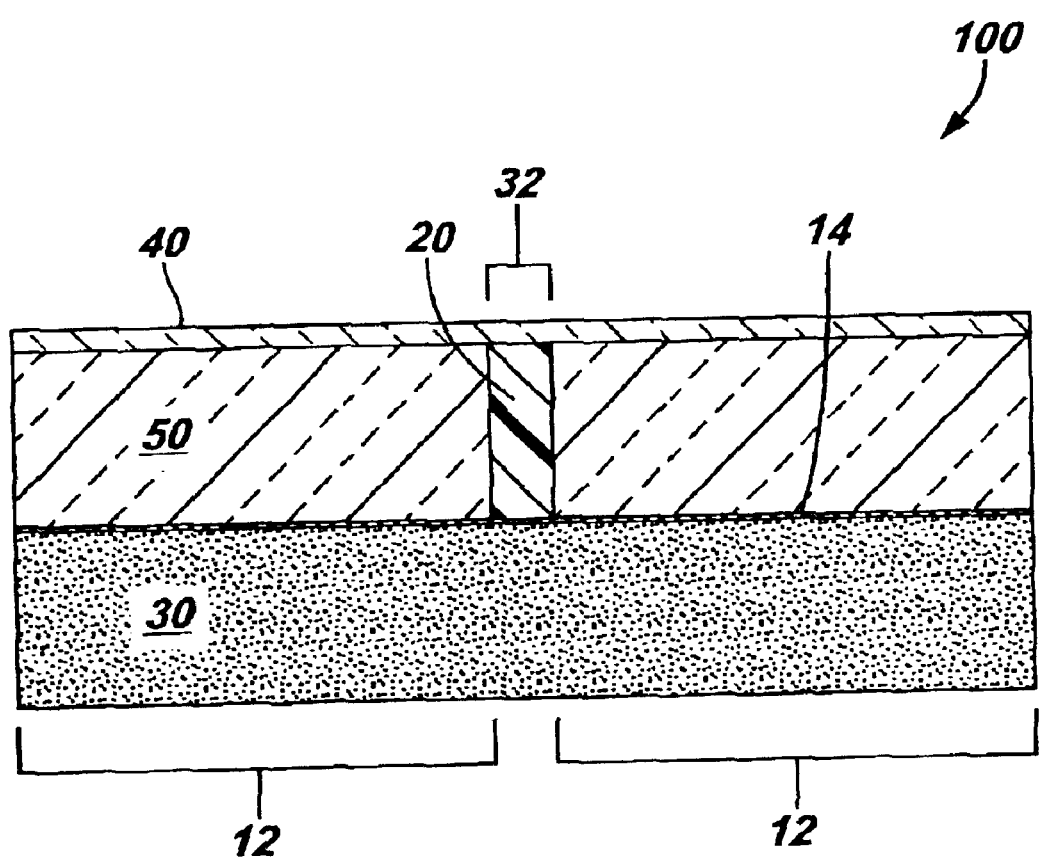
FIG. 2 is a side view of the LCOS display, including a couple of pixels.

The LCOS display 100 is a pixel array, typically comprising hundreds or thousands or more of individual pixels. As used herein, a pixel 12 consists of the portion of the LCOS display 100 that includes a single micro-mirror 10, including the substrate 30 beneath the micro-mirror as well as the liquid crystal 50 and transparent layer 40 above the micro-mirror. The pixel 12 does not include any of the space 32 between the micro-mirrors 10, which is essentially a no-micro-mirror region. This no-micro-mirror region is known herein as a no-pixel region 32. In the side view of FIG. 2, two pixels 12 of the LCOS display 100 are depicted, separated by a single spacer 20.

During the manufacture of the LCOS display 100, the spacers 20 are built upon the silicon substrate 30 using techniques familiar to those of skill in the art of integrated circuit fabrication. The spacers 20 are generated prior to adding the liquid crystal and surface layers to the LCOS display. Ultimately, the spacers 20 determine the uniformity of the liquid crystal material and, thus, the quality of light modulation achieved by the LCOS display 100.

Between each pixel 12 are spaces, known as the no-pixel region 32, some portion of which may be occupied by the spacers 20. The no-pixel region 32 is also the part of the patterned metal film 14 in which the reflective surface (micro-mirror) has been etched away. Since the micro-mirrors 10 are generally square in shape, the no-pixel region 32 forms a waffle-like pattern across the silicon substrate 30. The spacers 20 preferably occupy at least some, but preferably not all, of the no-pixel region 32 between the micro-mirrors 10.

Figure 3:
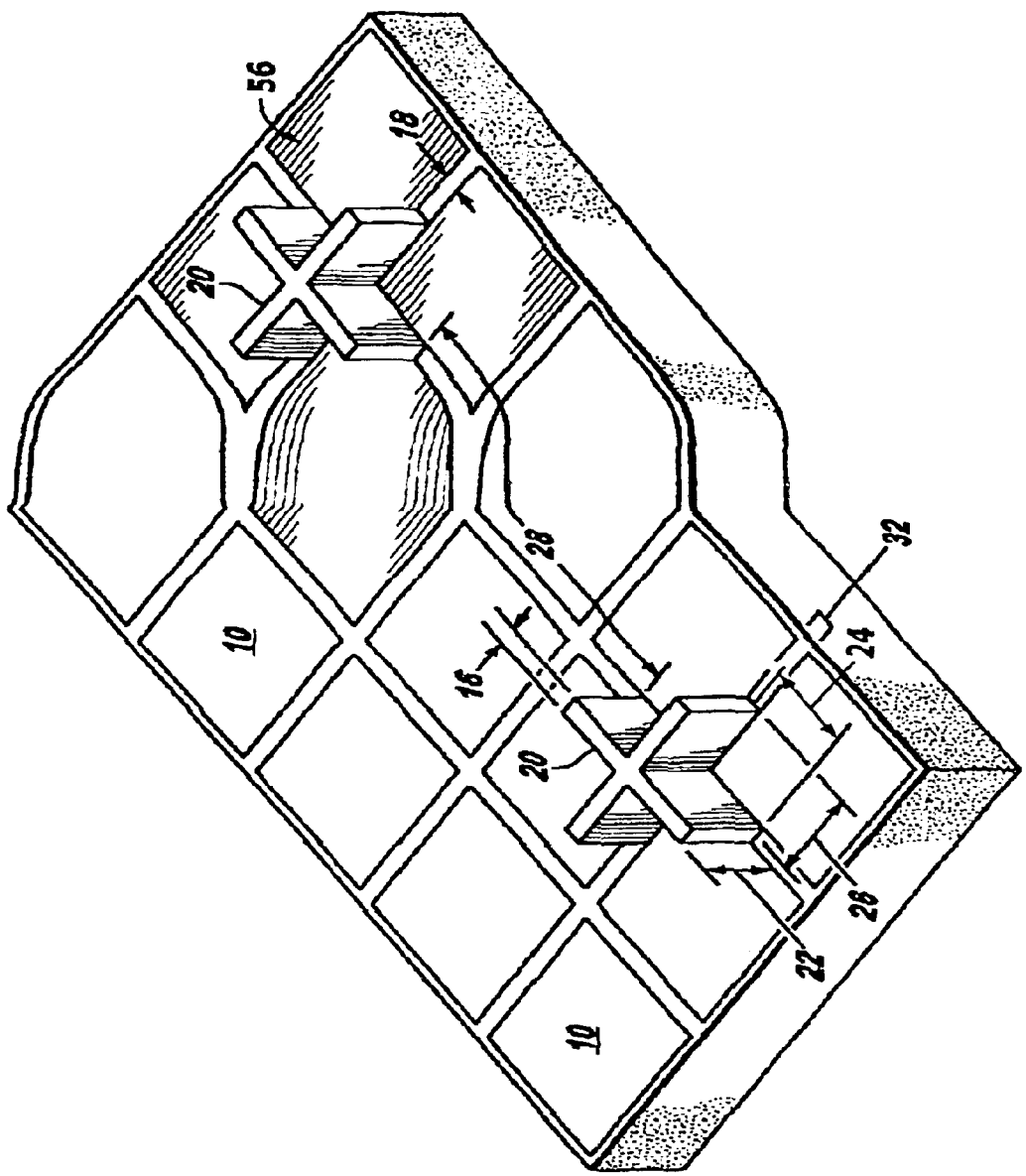
FIG. 3 is a perspective view of the LCOS display of FIG. 1, featuring various dimensions.

In FIG. 3, a second perspective view of the LCOS display 100 features spacer dimensions, as well as distance between spacers 20, according to some embodiments. The height 22, the length 24, the width 26, the thickness 16, the spacer distance 28, and the no-pixel region width 18 are included. The height 22 of the spacer 20 is dependent upon the properties of the liquid crystal material 50 used in the LCOS display 100. In some embodiments, the height 22 of the cross-shaped spacer 20 is between 1 and 5 microns.

The width 18 is the width of the no-pixel region 32. The no-pixel region 32 is the space where the patterned metal film 14 has been etched away from the substrate 30. Preferably, the thickness 16 of each spacer 20 is less than the no-pixel region width 18, so as to avoid the likelihood that the spacers 20 produce visible defects during light modulation. In some embodiments, the thickness 16 of the spacer 20 is between 0.2 and 0.5 microns, making the no-pixel region 32 at least slightly thicker than these dimensions.

FIG. 3 also shows the length 24 and the width 26 of the spacer 20. In some embodiments, the length 24 and the width 26 of the spacer 20 are identical, such that the spacer 20 comprises a uniform cross within a square region. Alternatively, the length 24 can be longer than the width 26, or vice-versa, such that the spacer 20 comprises an elongated cross within a rectangular region. The spacers 20 can also be diamond shaped, circular, oval, or other non-conforming shape, as long as the shape of the spacers does not extend beyond the no-pixel region 32.

The spacer distance 28, indicating the distance between spacers 20, is also variable. Preferably, the spacers 20 are sufficient in number along the LCOS display 100 to ensure that the overlying glass layer 40 is equidistant from the underlying substrate 30 at all points along the LCOS display 100. A spacer 20 may be positioned between each group of four pixels where one corner of each pixel is joined at a single point, known herein as a pixel group 56 (see FIG. 3). Preferably, however, a minimum number of spacers 20 is used to ensure that the layer 40 is equidistant from the substrate 30 at all locations. In some embodiments, the spacer distance 28 is 1.5 to 2.0 millimeters. Spacer distance can also be measured in the relation to the pixels 12. For example, in FIG. 3, spacers are positioned along every fourth pixel group 56.

The spacers 20 are preferably confined to within the no-pixel region 32. This arrangement reduces the possibility of interference with the transmitted light, which would otherwise create unwanted dark spots and image defects to the LCOS display 100.

FIGS. 4 and 5 depict manufacturing steps for producing the LCOS display 100, including the spacers 20, according to some embodiments. The steps of FIG. 4 (blocks 200–214) are correlated with the top (200A–214A) and side (200B–214B) views of FIG. 5, using like reference numerals. A pixel group 56 of the LCOS display 100 is depicted in FIG. 5.

Prior to commencement of the process (200A and 200B), the patterned metal film is shown, etched into four micro-mirrors 10 and affixed to the substrate 30. For example, the four micro-mirrors 10 are equally spaced apart and adjacent to the no-pixel region 32 upon which the spacers 20 are to be generated.

Upon commencement, silicon nitride ($Si_3N_4$) 38 is deposited on the patterned metal film 14 (block 202). The material from which the spacers 20 will be made, silicon nitride 38 is commonly used in the manufacture of integrated circuits. In the top view (202A) of FIG. 5, the micro-mirrors 10 are no longer visible, having been covered by the silver nitride material. In the side view (202B), the silicon nitride is visible as a block of material, from which the spacers 20 will be formed.

The height of the silicon nitride deposition is d+r, where d is the desired height of the spacers 20 and r is the thickness of an anti-reflective film or coating, to be deposited on the silicon nitride 38 later in the process (blocks 212 and 214).

Once the silicon nitride 38 is deposited on the patterned metal film 14, grooves 98 are ground into the surface of the silicon nitride (block 204). The top view (204A) and the side view (204B) of FIG. 5 depict the groove 98 as a channel along the silicon nitride 38. The depth of the groove 98 is limited such that the height of the silicon nitride deposit 38 remains at least of height d, or greater, even at the lowest point of the groove 98.

Next, the silver nitride surface is chemically and mechanically polished until the silver nitride 38 is of at least height d at all points (block 206). Most likely, the chemical and mechanical polishing is an automatic process performed by a machine. The bottom of the groove 98 provides a physical guide for the machine during the polishing process, indicating the desired minimum height of the silver nitride 38 after polishing. The top view of the pixel group (206A) shows only silver nitrate 38 while the side view (206B) shows the silver nitrate 38 deposited over the micro-mirrors 10.

Once the polishing is complete, a pattern 48 for the spacer 20 is generated, using standard lithography and dry etching techniques (block 208). The pattern 48, a uniform cross shape, is visible in the top view (208A) but not in the side view (208B) of FIG. 5. Alternatively, the pattern 48 may assume a distinct shape upon the no-pixel region 32. Once the pattern 48 is etched, lithography and dry etching techniques are again used to carve or sculpt through the silver nitride 38, using the pattern 48 as a guide, to form the spacer 20 (block 210). Preferably, care is taken not to damage the patterned metal film 14 as the silver nitride 38 is removed. In the top view (210A) of FIG. 5, the spacer 20, made entirely from the silver nitride deposit, is visible on top of the patterned metal film. Notice that the micro-mirrors 10 are again visible.

Subsequently, a first anti-reflective film or coating 78 is deposited on the pixel group 56, including both the newly formed spacer 20 and the patterned metal film 14 (block 212). Optionally, a second anti-reflective film or coating 88 may be deposited on the pixel group 56 (block 214). In some embodiments, a 75-Angstrom deposit of silicon dioxide ($SiO_2$) is used as the first layer of anti-reflective coating and a 75-Angstrom deposit of silicon nitride ($Si_3N_4$) is used as the second layer, for a total anti-reflective coating of 15 microns.

The side view (214B) of FIG. 5 shows the two layers 78 and 88 of the anti-reflective coating. Recall that, when the original deposit of silicon nitride 38 was made, the thickness was d+r, where d is the desired thickness of the spacers 20 and r is the thickness of the anti-reflective material. In some embodiments, the desired thickness of the anti-reflective material is 15 microns, which is achieved using two materials with a thickness of 75 angstroms each.

This additional material adds to the thickness of the spacer 20 itself. The actual desired height of the spacer 20 depends, in some part, upon the properties of the liquid crystal 30 used in the LCOS display 100. The desired spacer height is usually 1 to 5 microns, with the actual desired height depending on the properties of the liquid crystal material used in the light modulator.

Once the process described in FIGS. 4 and 5 is complete, the transparent layer 40 (see FIG. 1) is placed upon the spacers 20. The liquid crystal material 30 is injected into the cell gap, e.g., the space between the transparent layer 40 and the patterned metal film 14.

Because the spacers 20 are substantially uniform in height, the transparent plate 40 is substantially parallel with the patterned metal film 14. Further, the transparent plate 40 is equidistant from the substrate 30 at all points along the LCOS display 100. Advantageously, cell gap spacing is substantially uniform. The uniformity of cell gap spacing results in a higher quality LCOS display.

The benefits of the LCOS display 100 are particularly noticeable when the display is magnified. One application of LCOS displays is the development of small display footprints (on the order of an inch or less along its diagonal), which are then magnified substantially (twenty-five times magnification is not uncommon). The resulting display is competitive in size with current CRT and thin film transistor (TFT) displays.

Due to the small size of the LCOS display, defects in the display may not be evident. However, once the display is magnified, the defects can be most disruptive. On the LCOS display 100, visual defects are not evident, either before or after magnification, because the spacers 20 remain in the no-pixel region 32 of the substrate 30. In some embodiments, this results in a better quality display.

Further, the LCOS display 100 can be manufactured using known techniques and materials. The deposition, lithography, and etching techniques employed in building the spacers 20 are well known in the industry. The materials used are likewise familiar and widely available. In some embodiments, LCOS displays manufactured using the methods described in FIGS. 4 and 5 produce a high yield, relative to the prior art.

While the invention has been described with respect to a limited number of embodiments, those skilled in the art will appreciate numerous modifications and variations therefrom. It is intended that the appended claims cover all such modifications and variations as fall within the true spirit and scope of the invention.

I claim:

1. A display, comprising:
   a patterned metal film comprising an array of micro-mirrors on a substrate;
   spacers affixed to the substrate, the spacers occupying a region between the array of micro-mirrors, the spacers extending upward from the substrate, wherein the spacers are substantially uniform in height;
   a transparent layer resting upon the spacers;
   a liquid crystal material occupying a space between the transparent layer and the patterned metal film; and
   an anti-reflective coating covering the spacers and the patterned metal film;
   wherein light transmitted to the micro-mirrors is not substantially blocked by the spacers.

2. The display of claim 1, wherein the anti-reflective coating comprises a first layer and a second layer.

3. The display of claim 2, wherein the first layer comprises silicon oxide.

4. The display of claim 2, wherein the second layer comprises silicon nitride.

5. The display of claim 1, wherein the height of the spacers is less than ten microns.

6. The display of claim 1, wherein the spacers are less than one micron thick.

7. The display of claim 1, wherein the spacers are cross-shaped of a predetermined length and width.

8. The display of claim 7, wherein the length and width of the spacers are identical.

9. A spacer for use in a liquid crystal on silicon display, comprising:

a material, deposited upon a substrate of the display, the material occupying a region between micro-mirrors in a patterned metal film affixed to the substrate; and an anti-reflective coating, deposited atop the material; wherein a transparent plate seated atop the spacer is equidistant from the substrate at all locations along the display.

10. The spacer of claim 9, wherein the material comprises silicon nitride.

11. The spacer of claim 9, wherein the anti-reflective coating comprises equal parts silicon oxide and silicon nitride.

* * * * *